Oct. 7, 1941.    R. L. SJOSTROM    2,258,035
LINK FEED APRON
Filed March 18, 1941    2 Sheets-Sheet 1

Inventor
Robert L. Sjöström
by
Ezekiel Wolf
Attorney

Oct. 7, 1941.  R. L. SJOSTROM  2,258,035
LINK FEED APRON
Filed March 18, 1941  2 Sheets-Sheet 2

Inventor
Robert L. Sjöström
by
Ezekiel Wolf
Attorney

Patented Oct. 7, 1941

2,258,035

UNITED STATES PATENT OFFICE 2,258,035

LINK FEED APRON

Robert L. Sjostrom, Lawrence, Mass., assignor to Mary Sjostrom

Application March 18, 1941, Serial No. 383,891

7 Claims. (Cl. 198—178)

The present invention relates to link aprons and in particular to aprons used in the textile industry as a conveyor of loose lint, fibres or the like, but the apron may also be used as a conveyor of other materials as will be seen below.

In the present invention, the links are made of fabricated sheet metal with each link formed out of a single piece of metal and having link elements in the form of semi-cylinders running the length of the link. Each link is alike and normally meshes with the next in line, being retained in place by an end bracket extending over the lateral cylindrical end of each link of the apron.

The aprons may be of any desired length and width, the width of the apron being of the length of the link, and the whole apron may be driven by a sprocket shaft, but preferably by an interchangeable set of sprocket gears which may be mounted on the drive shaft to rotate the apron.

Further advantages and improvements in the present invention will be more readily understood from the specification below when taken in connection with the drawings showing an embodiment of the same in which.

Figure 1:
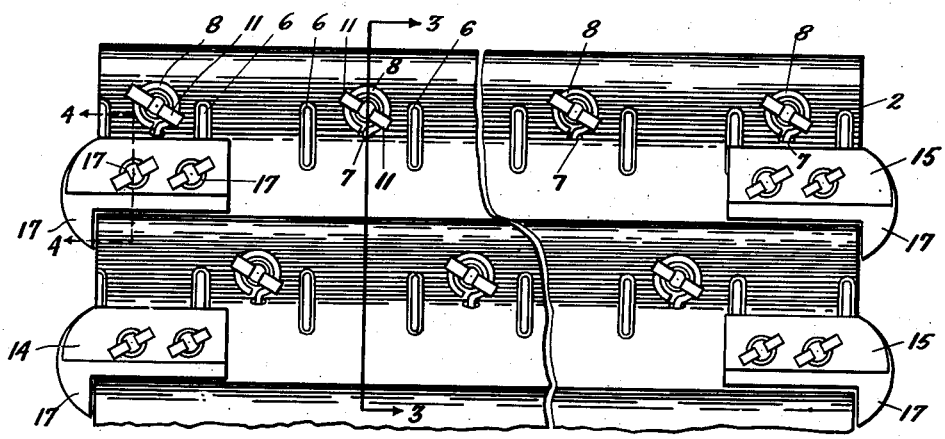
Figure 1 shows a plan view of a portion of the apron.

In the drawings 1 represents the links which may be any desired length and which are preferably made from metal sheets such as cold rolled metal by die rollers or the like.

Figure 3:
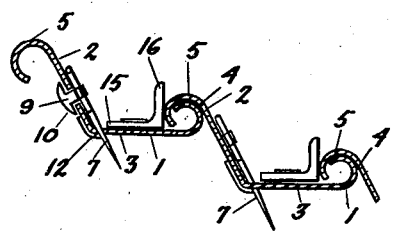
Figure 3 shows a sectional view on the line 3—3 of Figure 1.
Figure 5:
Figure 5 shows a modification of the view corresponding to Figure 3.

Different sectional forms of the links are shown in Figures 3 and 5. The sectional form indicated in Figure 3 is provided with a bent up section 2 so that the portions 2 and 3 of the links form an obtuse angle with each other. The ends of each link 4 and 5 are bent around in a semi cylindrical fashion with the cylindrical portion 4 meshing within the cylindrical portion 5 of the subsequent link.

As indicated in Figure 1 there is a group of parallel embosses 6, 6, 6, running transversely of the links lengths for adding strength to the construction. Each link is provided with a group of pins 7, 7, 7, etc., which have integrally formed therewith at one end, eyelet portions 8. These eyelet portions as indicated in Figure 3 are fastened to the inclined sections 2 of the link by means of the split rivets 9 which have flat heads 10 facing the outer side of the links with the stem projecting through the links and the eyelets 8 and bent over as indicated by the portions 11, 11, Figure 1. The pins in this manner lie flat against the section 2 of the link and project in the plane of the sections 2 through a perforation 12 in the base sections 3. The pins 7 therefore are inclined at an acute angle with the sections 3 of the links.

Figure 4:
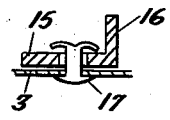
Figure 4 shows a sectional view on the line 4—4 of Figure 1.

As has been previously mentioned the cylindrical ends 4 and 5 mesh together and therefore may be rotated with respect to each other in a locked position. After these links are slid into place and meshed with each other, end clamping members 14 and 15 are attached. These end clamping members are angular in section as indicated in Figure 4 with a portion 16 riveted by means of the rivets 17 to the base portion 3 of the link. As indicated in Figure 3 the portion 16 comes close to the cylindrical end 5 and serves as a guard for the cylindrical sections at the lateral edges of the link. At the end of the member 14 there is provided a projecting flange 17 projecting over the ends of the cylindrical sections 4 and 5 so that the links, after they are fixed in place with respect to one another, cannot slide out laterally.

In the modified form shown in Figure 5, the links 20 are entirely flat, otherwise however, the construction of the cylindrical end members and the end edge guards are the same. In this case however the pins 21 are held in the flat section and have a bent point as indicated in the figure, bent so that the direction of the pin 21 and the portion 20 have the same angle as the pin 7 and the portion 3 in Figure 3.

Figure 6:
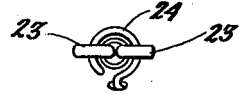
Figure 6 shows a fragmentary plan view of a portion of the detail shown in Figure 5.

In Figure 6 a plan view is shown of the pin installation in accordance with Figure 5. The split rivet 22 comes directly up from the flat section 20 with the split ends 23 lying over the eyelet portion 24 and holding the pin on the inside to the section 20.

Figure 2:
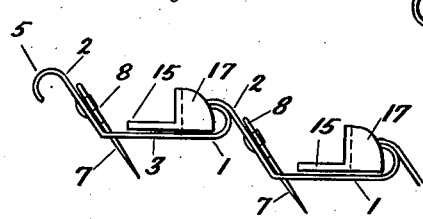
Figure 2 shows an end view.

In the views indicated in Figures 2, 3 and 5, the upper side may be considered to be the inside of the link and the lower side of the outside of the link or apron which performs the function of grasping or combing the fibers over which the pins pass.

While the arrangement of the present invention may be used for combing fibers, it is readily adaptable to use for conveying masses of fibers. Usually however it combines with the function of conveying the function of breaking up the bulk fibers and conveying them in loose form.

Figure 7:
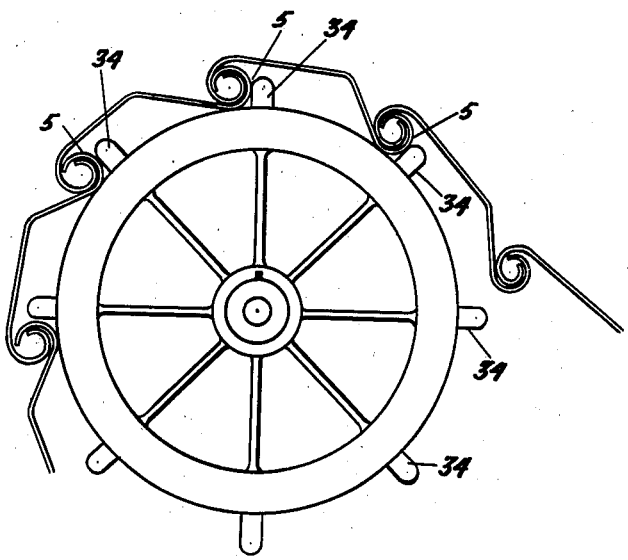
Figure 7 shows partly schematically the driving mechanism of the apron.
Figure 8:
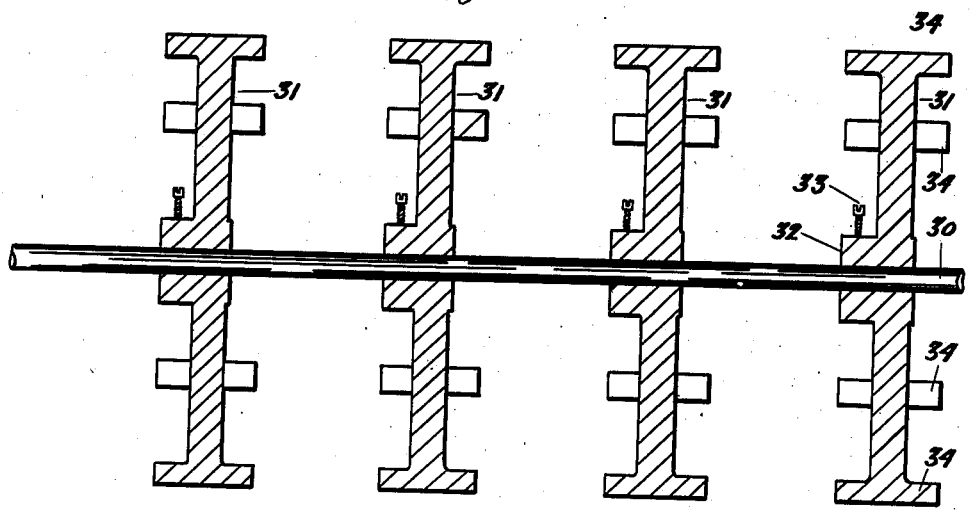
Figure 8 shows a section view through the shaft end and sprocket wheels corresponding to Figure 7.

The link elements are linked together to form an apron of the desired length and are driven by a drive shaft 30 by means of the sprocket wheels 31, 31, 31, etc., which are removably mounted on the shaft 30 by means of the hubs 32 and the locking bolts 33. As many of these sprocket wheels may be used on the shaft as is necessary to drive the apron. The number of course depends upon the width of the apron and the length, weight and kind of work which the apron is to do. Each sprocket wheel has a number of sprocket bars 34, 34, 34, etc., which are set into the periphery of the sprocket wheel crosswise as indicated in Figures 7 and 8. These sprocket bars engage the inside sections of the apron operating against the cylindrical portions 5 in a manner similar to that in which a sprocket wheel operates against the links in a sprocket chain. In this way no special means is needed for driving the apron, its own construction serving to supply the points against which the sprocket wheels grip.

Other forms and modifications of the invention will be evident from the construction described above, and the drawings, and therefore, I claim:

1. A link feed apron comprising a plurality of links formed of metallic sheet material, each having interlocking semi-cylindrical ends with surfaces partly in face to face relationship with each other and central sheet portions between such ends, and retaining members to retain said links together comprising brackets mounted at the lateral ends of the links and having a flange extending over the face of the lateral edges of said semi-cylindrical ends.

2. A link feed apron comprising a plurality of links formed of metallic sheet material, each having interlocking semi-cylindrical ends with surfaces partly in face to face relationship with each other and central sheet elements between such ends, and retaining members to retain said links together comprising brackets mounted at the lateral ends of the links and having a flange extending over the face of the lateral edges of said semi-cylindrical ends, a plurality of sharp pins with eyelets formed at one end, fastening means passing through said eyelets and attached to said central sheet element for holding the pins to said apron, said apron having perforations through which said pins pass to the side opposite to that to which they are fastened.

3. A link feed apron comprising a plurality of links formed of metallic sheet material, each having interlocking semi-cylindrical ends with surfaces partly in face to face relationship with each other and central sheet portions between such ends, and retaining members to retain said links together comprising brackets mounted at the lateral ends of the links and having a flange extending over the face of the lateral edges of said semi-cylindrical ends, a plurality of sharp pins with eyelets formed at one end, fastening means passing through said eyelets and attached to said central sheet element for holding the pins to said apron, said apron having perforations through which said pins pass to the side opposite to that to which they are fastened, and said pins being directed at an angle to the surface of the central sheet where they pass through the sheet.

4. A link feed apron comprising a plurality of links formed of metallic sheet material, each having interlocking semi-cylindrical ends with surfaces partly in face to face relationship with each other, said ends being joined by a central section formed with surfaces inclined to each other and retaining members to retain said links together comprising brackets mounted at the lateral ends of the links and having a flange extending over the face of the lateral edges of said semi-cylindrical ends.

5. A link feed apron comprising a plurality of links formed of metallic sheet material, each having interlocking semi-cylindrical ends with surfaces partly in face to face relationship with each other, said ends being joined by a central section formed with surfaces inclined to each other and retaining members to retain said links together comprising brackets mounted at the lateral ends of the links and having a flange extending over the face of the lateral edges of said semi-cylindrical ends, a plurality of sharp pins with eyelets formed at one end, means mounting said pins in said eyelet on one of said inclined surfaces and perforations in the other of said inclined surfaces through which said pins project.

6. A link feed apron comprising a plurality of links formed of metallic sheet material, each having interlocking semi-cylindrical ends with surfaces partly in face to face relationship with each other, said ends being joined by a central section formed with surfaces inclined to each other and retaining members to retain said links together comprising brackets mounted at the lateral ends of the links and having a flange extending over the face of the lateral edges of said semi-cylindrical ends, a plurality of sharp pins with eyelets formed at one end in the same plane as the pin, means mounting said pins in said eyelets flat to one of said surfaces and perforations in the other surfaces whereby said pins project through said surfaces substantially in the plane of the first surface.

7. A link feed apron comprising a plurality of links formed in metallic sheet material, each having interlocking semi-cylindrical ends with surfaces partly in face to face relationship with each other and central sheet portions between such ends, and retaining members to retain said links together comprising brackets mounted at the lateral ends of the links having a side projecting normally to the surface upon which it is mounted and facing the exterior of said semi-cylindrical ends and having a flange extending over the face of the lateral edges of said semi-cylindrical ends.

ROBERT L. SJOSTROM.